United States Patent Office 3,226,365
Patented Dec. 28, 1965

3,226,365
PROCESS FOR PRODUCING LIQUID NOVOLAK TYPE PHENOL-FORMALDEHYDE RESIN COMPOSITIONS
Iwao Yamamoto, Aki-gun, Hiroshima-ken, Japan, assignor to Toyo Kogyo Company Limited, Hiroshima-ken, Japan
No Drawing. Filed Dec. 4, 1961, Ser. No. 157,011
Claims priority, application Japan, Dec. 10, 1960, 35/49,001
2 Claims. (Cl. 260—57)

The invention relates to the production of liquid phenol-formaldehyde resin composition of the novolak type possessing characteristics suitable as resin material for coating sand to be used in shell molding and, also, is especially suited for production of resin coated sand by the cold process. Owing to the convenience in usage and handling of the resin coated sand for shell molding, it is being widely employed in making shell mold. However, as the resin coated sand, in majority of the cases, is made by the hot coating process wherein silica sand, resin material and a hardener are heated and admixed, it requires a special type of mixing apparatus and a strict process control, and, thus, it is difficult for the foundry shops in general to readily produce resin coated sand. Accordingly, a resin coated sand made by the cold coating process, wherein the silica sand, resin material and a hardener are admixed under normal temperature, is, also, because of the simplicity of method of production, being employed. However, as the resin coated sand made by the cold coating process is inferior in characteristics and storageability as compared to the resin coated sand made by the hot coating process, it is not being used widely as yet. Such shortcomings are to be attributed to the fact that the resin material is not fully adaptable to the cold coating process and a perfect resin coating of the sand cannot be attained.

Liquid phenolic resinous substance has been suggested as a material well-suited for coating the sand in a cold coating process. However, in actual practice, the molded shell produced by employing the coated sand coated with the said resinous material in the cold coating process still proves defective when it is compared with that produced through the above-mentioned hot coating process, in respect to strength of the shell mold, moldability, storageability, etc. The invention herein has improved these shortcomings by pre-effecting a similar modification or reaction on the resin material during the process of making of resin, as it would undergo during the hot coating process, and provides for the production of liquid phenol-formaldehyde resin composition of the novolak type, which is much more suited to the cold coating process.

The method of production according to the invention comprises, firstly, adding formaldehyde of under equal mol to 1 mol of phenol, reaction is advanced at a relatively low temperature of under 80° C., preferably under about 70° C., while controlling in steps the reaction temperature, and condensation reaction is effected until a free phenol content of about 10% to 14% to the total admixture is obtained. The length of time required for this reaction is about 7 hours. Following, the catalyst is adjusted to between pH 5 and pH 7 and reaction is further advanced to the extent until about 0.05% to 0.3% nitrogen content of the created resin (to the created resin solids content) is obtained in presence of formaldehyde in the amount sufficient to effect reaction of un-reacted free phenol, preferably by adding 0.2 to 0.8 part of hexamethylenetetramine by weight to 100 parts of phenol by weight, or else ammonia equivalent to the amount of the hexamethylenetetramine. If the above ratio for addition of the hexamethylenetetramine or ammonia is maintained, about 2 hrs. will be required for the reaction at a reaction temperature of around 80° C., and the amount of free phenol will be decreased to about 8 to 11% by weight to the total admixture. Following, the reaction product is washed several times by adding warm water or else a permeability detergent together with the warm water until the content of free phenol is decreased to about 5% to 7% by weight to the resin solids content by weight, then, the vacuum dehydration is carried out to the extent that the water content of the product formed will be reduced to under 5% to 7%, whereby as a liquid resin composition with a viscosity in the range of from 20,000 to 50,000 centipoises at 50° C. is obtained, the viscosity is adjusted so as to attain a viscosity of in the range from 1,000 to 5,000 centipoises at 25° C. by adding a solvent such as alcohol, ketone or the like. In this manner, a liquid resin composition with a modified phenol-formaldehyde resin of the novolak type in the state of A stage condensation as its main component is obtained.

In this case, the purpose of using a highly concentrated acid catalyst of around pH1 and, further, restricting the reaction temperature under 80° C., preferably under 70° C., during the primary stage, is to arrest as much as possible the formation of a dimer or else of over trimer, while forming a large amount of methylol phenol monomer, to produce a low molecular weight condensate and, simultaneously, to reduce the amount of remaining free phenol in a short length of time. If, in this case, a high reaction temperature of around 100° C. is maintained as is usual in production of resin material for use in conventional molding practice, the adhesion of the methylol group to the formed methylol phenol nuclied and the condensation of nuclieds will be rapidly advanced and, thus, the reaction product will take a high molecular weight. Also, the purpose of employing a highly concentrated acid catalyst is to shorten the very long time required for the reaction which is retarded by the relatively low temperature at which it is effected, and to reduce the large amount of remaining free phenols. Consequently, if the acid catalyst is similar to the one normally employed, it will not be practicable to produce the resin on an industrial basis owing to the low reaction temperature and, as well as, the very long time required for the reaction.

The reason for having set the limit of holding the content of free phenol at about 10% to 14% by weight to the total admixture at the ending stage of the reaction is because by decreasing the content of free phenol below the said content during the reaction would result in un-purposelessly extending the reaction time and, simultaneously condensation will be gradually expedited and the formed condensate will take a high molecular weight. Of course, as the content of the free phenol will be related to mol ratio of the phenol and the formaldehyde employed, the range of the mol ratio of raw materials employed for the purpose of creating an ordinary novolak resin, i.e., under equal mol to 1 mol of phenol, for an example, when employing a formaldehyde of 0.9 to 0.7 mol, restricting in steps the reaction temperature at below 80° C., preferably below 70° C., and promoting reaction for about 7 hours., it may be assumed that the limit will be nearly settled, but, if required, the time of termination of the reaction may be determined by taking a specimen from the reactor and calculating the content of free phenol.

Following, the acid catalyst of the reaction product is adjusted to between pH 5 and pH 7, and a sufficient amount of formaldehyde to effect reaction of un-reacted free phenol is added, or else, when an adequate amount of formaldehyde to effect reaction remains, hexamethylenetetramine or ammonia is added intact to promote reaction. Whereby, a major portion of the condensate formed in the preceding reaction comprised of a dimer or trimer will be modified to possess a structural formula of

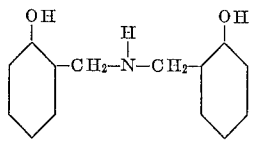

The condition prevailing at this time can be considered to be identical to that of a partial reaction which occurs between the resin material, which is heated and mixed together with the silica sand when making resin coated sand by the hot coating process, and the hexamethylenetetramine. The extent of the partial reaction, under the hot coating process is controlled in accordance with the degree of rising of the melting point of the resin layer formed on the sand, whereas, according to this invention, it depends on the amount of nitrogen cohered to the formed resin, and has been found through experiments carried out that favorable results are obtained when the amount of nitrogen to the formed resin solids content by weight is modified to the range of 0.05 to 0.3%. If the amount of nitrogen is below 0.05%, the effects of modification are insufficient and lacking in reactivity, there is a tendency, when fabricating shell molds with resin coated sand made with such resin material, of the curing being retarded and increasing the thickness of the shell mold and causing peel backs. On the contrary when the amount of nitrogen exceeds 0.3%, excess reaction will occur and, during the dehydration process, there is a possibility of the resin to harden and transforming into a bakelite C inside the reactor, which is dangerous to operation and will cause a formation of high molecular weight resin composition. Consequently, a fragile shell mold only can be obtained when fabricated with the resin coated sand made with such a resin. However, it is difficult to calculate the content of nitrogen at varying stages of the reaction process, in actual operation, it is substituted by fixing the amount of hexamethylenetetramine or ammonia and the conditions for reaction and calculating the content of free phenol contained in the reaction product. In this case, the amount of hexamethylenetetramine or ammonia to be employed depends on the conditions of reaction. However, if the reaction is effected at a temperature of about 80° C. whereby efficiency and safety of operation can be attained, the content of hexamethylenetetramine or ammonia should be 0.2 to 0.8 part by weight to 100 parts of phenol by weight, and, thus, if it is under 0.2 part, then, the amount of nitrogen cohering will be small and effects of modification will be weak, whereas, if it is over 0.8 part, reaction will drastically advance and safe operation cannot be expected. When, under such a condition of reaction, the reaction is terminated at a stage wherein the content of free phenol contained in the reaction product reaches 8% to 11% by weight to the formed resin solids content, the amount of nitrogen cohering to the formed resin is held within the aforementioned range and a satisfactory result may be attained. The reason for adjusting the acid catalyst to between pH 5 and pH 7 and causing the presence of an appropriate amount of formaldehyde during the reaction is, if the acid catalyst falls out of this range, reaction will drastically advance, whereby, safety of operation will be hampered and, as well, as the stability of reaction product will be impaired in connection with the absence of neutralizing process thereafter. Further, as the formaldehyde reacts by condensation mainly with the free phenol to serve in decreasing free phenol and, simultaneously, assists the reaction between the hexamethylenetetramine or ammonia and the formed condensate, an amount of formaldehyde sufficient to effect a reaction by condensation with the free phenol is all that is needed, and, consequently, further addition of formaldehyde is not required when a large amount of unreacted formaldehyde remains from the preceding reaction.

Next, warm water or warm water together with a permeability detergent is added to powerfully wash the reaction product formed which is mainly for the purpose of decreasing the free phenol remaining in the reaction product formed to between 8% and 10%, and is washed several times until the free phenol is decreased to about 5% to 7% by weight to resin solids content formed. This is achieved by 3 or 4 washings when solely warm water of about 50° C. is used, but the number of washings may be reduced if a permeability detergent is used together with the warm water. During the washing, salts formed by the reaction, unreacted formaldehyde, hexamethylenetetramine or ammonia, and other foreign matters may likewise be eliminated. The employment of a condensate with 8% to 11% free phenol remaining in the cold coating process will render making of resin coated sand extremely difficult. On top, when a resin coated sand so made is employed in fabricating the shell mold, curing rate will be retarded, peel backs will occur and, at the same time, will absorb moisture and harden, lose storage stability and render it impracticable. Furthermore, if an attempt is made to decrease these defects by means of the aforementioned 2 step reaction, reaction by condensation will be advanced and cause the formed condensate to take a high molecular weight which is contrary to the initial aim. Thus, it is to be distinguished from the hitherto process of washing in respect with decreasing of free phenol being effectively carried out while arresting the advance of reaction by means of the washing process in connection with the preceding 2 step reaction.

After washing, the water content of the reaction product is vacuum dheydrated to under 5% to 7% and should be reduced as much as possible in respect of the mixing operation which takes place during the cold coating process. Nevertheless, if the water content is excessively reduced, the viscosity of the reaction product will drastically increase and become difficult to handle, it is desirable that the dehydrating process be terminated at the aforementioned stage. Because the viscosity of the condensate formed will be from 20,000 to 50,000 centipoises at 50° C., it will require adjustment of viscosity suitable to make resin coated sand and, thus, the viscosity is adjusted to between 1,000 and 5,000 centipoises at 25° C. by adding alcohols or ketones independently or an admixture of both.

The results obtained from repeated experiments on the aforementioned operation by changing the conditions of reaction proved the liquid resin composition composed of a phenol-formaldehyde resin of the novolak type of A stage condensation modified to possess 0.05% to 0.3% nitrogen cohesion by weight as its principal component, 60% to 75% resin solids content by weight, 3% to 5% free phenol by weight, under 5% water content, and a very small amount of reaction residue and remaining of solvents such as alcohol, ketone and its like, to be most favorable for use in making resin coated sand by the cold coating process.

The invention is illustrated in the following examples:

Example 1

Add 620 kg. of formalin (38 vol. percent) by weight to 800 kg. of phenol by weight, admix 10.4 liters of hydrochloric acid (6 N) as a catalyst at 30° C. in order to obtain a pH 0.9, and the rise of the temperature generated by the reaction heat is caused to rise 0.5° C. per minute until it reaches 50° C. while cooling with water. After condensation reaction is effected for 1 hr. at 50° C., the temperature is raised to 70° C. and continuously reacted for 4 hrs. At this stage, the amount of free phenol will be about 12% by weight to the total admixture. Following, the pH is adjusted to 5.6 to 6 by adding 10.4 liters of sodium hydroxide (6 N), then 52.8 kg. of formalin (38 vol. percent) and 4.48 kg. of hexamethylenetetramine are added and continuously reacted for about 2 hrs. at 80° C., whereby free phenol will be deceased to around 10% by weight. After cooling, warm water of 50° C. equal in amount to the total mixture is added and washed. The similar washing is repeatedly carried out 4 times. Then vacuum dehydration is effected at 60 mm. Hg for about 4 hrs., whereby a liquid resin composition with a viscosity of about 30,000 centipoises is obtained which is diluted by adding an appropriate amount of methanol. Thus, a liquid phenol-formaldehyde resin composition of the novolak type composed of about 70% resin solids content by weight, about 4.5% free phenol by weight, about 3% water content by weight, a very small amount of reaction residue, and remaining of methanol, and, further, being modified to possess about 0.15% nitrogen cohesion by weight to the formed resin solids content, will be obtained.

*Example 2*

By changing the amount of hexamethylenetetramine additive in Example 1 to 6.72 kg. and in the same manner effecting reaction, the free phenol will be decreased to about 9.5% by weight. To this is added water of 50° C. in the amount approximately equal by weight to the total reaction product, and a permeability detergent [Pelex OT(dialkylsulphosuccinate)] in proportion of 0.5 to 1 gram to 1 liter of water, and washed 3 times. Thus, when the treatment is followed in accordance with Example 1, a liquid phenol-formaldehyde resin composition of the novolak type composed of about 75% resin solids content by weight, about 4% free phenol by weight, about 2.5% water content by weight, a very small amount of reaction residue, and remaining of methanol, and, further, of being modified so as the formed resin possesses about 0.22% nitrogen cohesion by weight to the formed resin solids content, will be obtained.

*Example 3*

By changing the amount of hexamethylenetetramine additive in Example 1 to 2.24 kg. and in the same manner effecting reaction, the free phenol will be decreased to around 11% by weight. Thus, when the treatment is followed in accordance with Example 1, a liquid phenol-formaldehyde resin composition of the novolak type composed of about 65% resin solids content by weight, about 5% free phenol by weight, about 4% water content by weight, a very small amount of reaction residue, and remaining of methanol, and, further, of being modified so as the formed resin possesses about 0.05% nitrogen cohesion by weight to the formed resin solids content, will be obtained.

*Example 4*

By substituting the hexamethylenetetramine in Example 1 with 7.8 kg. of ammonia water (20 vol. percent) and continuously effecting reaction for about 3 hrs. at 80° C., and the treatment is followed in accordance with Example 1, a liquid phenol-formaldehyde resin composition of the novolak type composed of about 70% resin solids content by weight, about 4% free phenol by weight, about 4% water content by weight, a very small amount of reaction residue, and remaining of methanol, and, further, modified so as the formed resin possesses about 0.1% nitrogen cohesion by weight to the formed resin solids content, will be obtained.

When a shell mold is fabricated with the coated sand made of the following mixture ratio with the resin composition given in above examples as its raw material, according to the cold coating process, the resultant properties of the shell mold are as follows:

1. Ratio of Mixture:                Parts by weight
   Silica sand _____ 100
   Resin composition _____ 4
   Hexamethylenetetramine _____ 0.45
   Wax _____ 0.10

2. Properties of the Shell Mold:

| Kind of Resin Composition | Melting Point, °C. | Tensile Strength, kg./cm.$^2$ | Bending Strength, kg./cm.$^2$ | Thickness of Shell, mm. |
|---|---|---|---|---|
| Example 1 | 98 | 25-30 | 50-55 | 5.3-5.6 |
| Example 2 | 100 | 21-24 | 35-38 | 4.8-5.0 |
| Example 3 | 92 | 25-30 | 50-60 | 6.0-6.5 |
| Example 4 | 95 | 20-25 | 32-36 | 5.6-5.8 |

As the foregoing description and examples are self-explanatory, the invention enables making of a resin material suited to the cold coating process, by means of a relatively simple operation, and provides a liquid resin composition possessing favorable composition and components for the cold coating process as well, and will contribute greatly towards the field of shell mold casting process.

What is claimed is:

1. A process which comprises (a) condensing phenol with formaldehyde at a temperature of less than 80° C., at a pH of about 1 and at a phenol-formaldehyde initial molar ratio of more than 1 until the free phenol content of resultant condensate admixture is from 10 to 14 percent by weight; (b) adjusting the pH of the resultant condensate admixture to a pH of from 5 to 7; (c) adding to said condensate admixture with a pH of from 5 to 7 sufficient formaldehyde to react with the free phenol and from 0.2 to 0.8 part by weight of hexamethylenetetramine per 100 parts by weight of initial phenol; (d) maintaining the product of step c at a temperature of about 80° C. for about 2 hours, whereby a liquid resin product having a free phenol content of from 8 to 11 percent by weight is obtained, the resin of the liquid resin product being an A-stage Novolak resin having a combined nitrogen content of from 0.05 to 0.3 percent by weight; (e) water-washing the liquid resin product to reduce the free phenol content thereof to from 5 to 7 percent by weight based on total solids; (f) dehydrating the water-washed liquid resin to a water content of less than 7 percent by weight, whereby a liquid A-stage Novolak resin having a viscosity at 50° C. of from 20,000 to 50,000 centipoises is obtained; and (g) adding solvent to the A-stage Novolak resin to reduce its viscosity to from 1,000 to 5,000 centipoises at 25° C., whereby there is obtained a liquid phenol-formaldehyde/solvent composition having a viscosity of from 1,000 to 5,000 centipoises at 25° C., a resin solids content of from 65 to 75 percent by weight, a free phenol content of from 3 to 5 percent by weight and a water content of less than 5 percent by weight, the liquid resin being an A-stage Novolak resin having from 0.05 to 0.3 percent by weight of combined nitrogen.

2. A process which comprises (a) condensing phenol with formaldehyde at a temperature of less than 70° C., at a pH of about 1 and at a phenol-formaldehyde initial molar ratio of from 1/0.7 to 1/0.9 until the free phenol content of resultant condensate admixture is from 10 to 14 percent by weight; (b) adjusting the pH of the resultant condensate admixture to a pH of from 5 to 7; (c) adding to said condensate admixture with a pH of from 5 to 7 sufficient formaldehyde to react with the free phenol and an amount of ammonia equivalent to from 0.2 to 0.8 part by weight of hexamethylenetetramine per 100 parts by weight of initial phenol; (d) maintaining the product of step c at a temperature of about 80° C. for about 2 hours, whereby liquid resin product having a free phenol content of from 8 to 11 percent by weight is obtained, the resin of the liquid resin product being an A-stage Novolak resin having a combined nitrogen content of from 0.05 to 0.3 percent by weight; (e) repeatedly water-washing the liquid resin product with water at a temperature of about 50° C. to reduce the free phenol content thereof to from 5 to 7 percent by weight based on total solids; (f) vacuum dehydrating the water-washed liquid resin to a water content of less than 5 percent by weight, whereby a liquid A-stage Novolak resin having a viscosity at 50° C. of from 20,000 to 50,000 centipoises is obtained; and (g) adding methanol to the A-stage Novolak resin to reduce its viscosity to from 1,000 to 5,000 centipoises at 25° C., whereby there is obtained a liquid phenol-formaldehyde/methanol composition having a viscosity of from 1,000 to 5,000 centipoises at 25° C., a resin solids content of from 65 to 75 percent by weight, a free phenol content of from 3 to 5 percent by weight and a water content of less than 5 percent by weight, the liquid resin being an A-stage Novolak resin having from 0.05 to 0.3 percent by weight of combined nitrogen.

References Cited by the Examiner

UNITED STATES PATENTS

| | | | |
|---|---|---|---|
| 1,414,139 | 4/1922 | Kulas | 260—57 |
| 1,508,124 | 9/1924 | Richardson | 260—57 |
| 2,357,091 | 8/1944 | D'Alelio | 260—57 |
| 2,473,145 | 6/1949 | Hesselbart | 260—57 |
| 2,663,698 | 12/1953 | Compton | 260—57 |
| 2,838,473 | 6/1958 | Partansky et al. | 260—57 |

FOREIGN PATENTS 646,080  11/195  Great Britain.

WILLIAM H. SHORT, *Primary Examiner.*
PHILIP E. MANGAN, *Examiner.*